US 12,152,540 B2

(12) United States Patent
Yamamoto et al.

(10) Patent No.: US 12,152,540 B2
(45) Date of Patent: Nov. 26, 2024

(54) FUEL CONTROL DEVICE, COMBUSTOR, GAS TURBINE, CONTROL METHOD, AND NON-TRANSITORY COMPUTER-READABLE MEDIUM

(71) Applicant: MITSUBISHI HEAVY INDUSTRIES, LTD., Tokyo (JP)

(72) Inventors: Keisuke Yamamoto, Tokyo (JP); Takashi Sonoda, Tokyo (JP); Akihiko Saito, Tokyo (JP); Fuminori Fujii, Kanagawa (JP); Hisashi Nakahara, Kanagawa (JP); Ryoichi Haga, Kanagawa (JP); Ryuji Takenaka, Kanagawa (JP); Yoshifumi Iwasaki, Kanagawa (JP); Wataru Akizuki, Kanagawa (JP); Isamu Matsumi, Kanagawa (JP); Naohiro Sumimura, Kanagawa (JP); Shinichi Yoshioka, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/960,360

(22) Filed: Oct. 5, 2022

(65) Prior Publication Data
US 2023/0022473 A1     Jan. 26, 2023

Related U.S. Application Data

(62) Division of application No. 15/108,420, filed as application No. PCT/JP2015/054097 on Feb. 16, 2015, now Pat. No. 11,492,981.

(30) Foreign Application Priority Data

Feb. 26, 2014   (JP) .................................. 2014-034871

(51) Int. Cl.
*F02C 9/28* (2006.01)
*F02C 9/26* (2006.01)
(Continued)

(52) U.S. Cl.
CPC ................ *F02C 9/28* (2013.01); *F02C 9/263* (2013.01); *F23N 1/002* (2013.01); *F23N 5/242* (2013.01);
(Continued)

(58) Field of Classification Search
CPC ............... F23R 3/28; F02C 9/263; F02C 9/28
See application file for complete search history.

(56) References Cited

U.S. PATENT DOCUMENTS 7,269,953 B2   9/2007   Gadde et al.
8,739,551 B2   6/2014   Grewe
(Continued)

FOREIGN PATENT DOCUMENTS

JP    62-174539    7/1987
JP    6-10711      1/1994
(Continued)

OTHER PUBLICATIONS

International Search Report issued May 19, 2015 in International Application No. PCT/JP2015/054097.
(Continued)

*Primary Examiner* — Arun Goyal
(74) *Attorney, Agent, or Firm* — Wenderoth, Lind & Ponack, L.L.P.

(57) ABSTRACT

A fuel control device includes a combustion temperature estimation value calculation unit that calculates a temperature estimation value when a mixture of fuel and inflow air is burned using an atmospheric condition, an opening degree command value of a valve that controls the amount of air that is mixed with the fuel and burned, and an output (Continued)

prediction value calculated on the basis of a fuel control signal command value used for calculation of a total fuel flow rate flowing through a plurality of fuel supply systems, a fuel distribution command value calculation unit that calculates a fuel distribution command value indicating a distribution of fuel output from the fuel supply systems based on the temperature estimation value, and outputs the fuel distribution command value, and a valve opening degree calculation unit that calculates each valve opening degree of a fuel flow rate control valve of the fuel supply systems.

9 Claims, 15 Drawing Sheets

(51) Int. Cl.
 *F23N 1/00* (2006.01)
 *F23N 5/24* (2006.01)
 *F23R 3/28* (2006.01)
(52) U.S. Cl.
 CPC ............ *F23R 3/28* (2013.01); *F05D 2240/12* (2013.01); *F05D 2270/301* (2013.01); *F05D 2270/303* (2013.01); *F05D 2270/44* (2013.01); *F23N 2225/20* (2020.01); *F23N 2241/20* (2020.01); *F23R 2900/00013* (2013.01)

(56) References Cited

U.S. PATENT DOCUMENTS

| 9,255,525 | B2 | 2/2016 | Ewens |
| 9,599,018 | B2 | 3/2017 | Belzner |
| 9,665,077 | B2 | 5/2017 | Jordan, Jr. |
| 9,765,701 | B2 | 9/2017 | Reed |
| 2007/0079593 | A1 | 4/2007 | Fujii et al. |
| 2007/0089395 | A1 | 4/2007 | Fujii et al. |
| 2010/0198419 | A1 | 8/2010 | Sonoda et al. |
| 2011/0041510 | A1 | 2/2011 | Sasaki |
| 2012/0167581 | A1 | 7/2012 | Pesce |
| 2014/0150438 | A1 | 6/2014 | Ellis |

FOREIGN PATENT DOCUMENTS

| JP | 2004-27891 | 1/2004 |
| JP | 2007-77866 | 3/2007 |
| JP | 2007-77867 | 3/2007 |
| JP | 4119909 | 7/2008 |
| JP | 2012-92681 | 5/2012 |
| WO | 2009/060889 | 5/2009 |

OTHER PUBLICATIONS

Written Opinion of the International Searching Authority issued May 19, 2015 in International Application No. PCT/JP2015/054097.

Office Action issued May 30, 2017 in corresponding Japanese patent application No. 2014-034871 (with Machine Translation obtained by Global Dossier on Jun. 6, 2017).

FUEL CONTROL DEVICE, COMBUSTOR, GAS TURBINE, CONTROL METHOD, AND NON-TRANSITORY COMPUTER-READABLE MEDIUM

TECHNICAL FIELD

The present invention relates to a fuel control device, a combustor, a gas turbine, a control method, and a program.

Priority is claimed on Japanese Patent Application No. 2014-034871, filed Feb. 26, 2014, the content of which is incorporated herein by reference.

BACKGROUND ART

In supply of fuel to a combustor of a gas turbine, the fuel is divided and supplied to a plurality of systems in terms of efficiency or stability of combustion in some cases. In such cases, it is necessary to consider distribution of the fuel to the respective systems.

FIG. 14 is a diagram illustrating an example of a fuel distribution control of a gas turbine of the related art. As illustrated in FIG. 14, the fuel control device of the related art estimates a temperature of a combustion gas at an inlet of the turbine on the basis of an atmospheric pressure, an atmospheric temperature, an inlet guide vane (IGV) opening degree designation value, and a gas turbine output value, and calculates a ratio of the fuel to be assigned to respective systems on the basis of a turbine inlet temperature estimation value. The fuel control device determines a fuel supply amount for supply to a nozzle of each fuel system from a distribution ratio for distribution to each system and a total fuel flow rate based on a fuel control signal command value (CSO), and controls a valve opening degree of a fuel flow rate control valve provided in each system.

Further, combustion vibration has been known to occur in a combustor of a gas turbine, for example, if a distribution ratio of fuel supplied from a plurality of systems is changed. Since the combustion vibration is a pressure fluctuation within the combustor and damages the combustor or components of the gas turbine, it is necessary to suppress the combustion vibration (see Patent Literature 1).

FIG. 15 is a diagram illustrating an example of a relationship between a fuel distribution ratio for distribution to a certain fuel system and a turbine inlet temperature during a load change in the related art. As illustrated in FIG. 15, there are regions (region 74 and region 75) in which combustion vibration occurs according to the fuel distribution ratio and a value of the turbine inlet temperature. Further, a target operation line 71 indicates a target operation line indicating a relationship between a fuel distribution ratio at which such a combustion vibration does not occur and a turbine inlet temperature. In the fuel control device, it is preferable to control the distribution ratio of the fuel supplied to each system so that the fuel distribution ratio becomes a fuel distribution ratio at which a combustion vibration occurrence region can be avoided as shown by the target operation line 71.

CITATION LIST

Patent Literature

[Patent Literature 1]
Japanese Unexamined Patent Application, First Publication No. 2012-92681

SUMMARY OF INVENTION

Technical Problem

When an output of a gas turbine fluctuates, an inlet temperature of the turbine correspondingly changes. Particularly, if the fluctuation is sharp, a turbine inlet temperature estimation value calculated as above is not in time for a change in an actual gas turbine inlet temperature. In this case, an operation line indicating a relationship between a fuel distribution ratio calculated by a fuel control device on the basis of the turbine inlet temperature estimation value and the actual gas turbine inlet temperature may be included in the combustion vibration occurrence region. For example, an operation line 72 is an example of an operation line when a load increases, and an operation line 73 is an example of an operation line when the load decreases. In either case, the combustion vibration is likely to occur.

The present invention provides a fuel control device, a combustor, a gas turbine, a control method, and a program capable of solving the above-described problem.

Solution to Problem

According to a first aspect of the present invention, a fuel control device includes a combustion temperature estimation value calculation unit that calculates a temperature estimation value when a mixture of fuel and inflow air is burned using an atmospheric condition, an opening degree command value of a valve that controls the amount of air that is mixed with the fuel and burned, and an output prediction value calculated on the basis of a fuel control signal command value used for calculation of a total fuel flow rate flowing through a plurality of fuel supply systems; a fuel distribution command value calculation unit that calculates a fuel distribution command value indicating a distribution of fuel output from the plurality of fuel supply systems on the basis of the temperature estimation value, and outputs the fuel distribution command value; and a valve opening degree calculation unit that calculates each valve opening degree of a fuel flow rate control valve of the plurality of fuel supply systems on the basis of the fuel distribution command value and the total fuel flow rate based on the fuel control signal command value.

According to a second aspect of the present invention, the fuel control device includes a gas turbine output prediction value calculation unit that calculates the output prediction value on the basis of a predetermined correspondence relationship between the fuel control signal command value and an output value of a gas turbine, and the fuel control signal command value.

According to a third aspect of the present invention, the fuel control device includes a gas turbine output correction amount calculation unit that calculates a gas turbine output correction amount for correcting the output prediction value on the basis of a predetermined correspondence relationship between the fuel control signal command value and a value for correcting an output of a gas turbine, and the fuel control signal command value; and a gas turbine output prediction value calculation unit that calculates the output prediction value using an actually measured value of an output value of the gas turbine and the gas turbine output correction amount.

According to a fourth aspect of the present invention, the fuel control device includes a coefficient calculation unit that calculates a weighting coefficient for the gas turbine output correction amount according to a value indicating an output change of the gas turbine per unit time.

According to a fifth aspect of the present invention, the fuel control device includes a load change rate determination unit that detects an output change of the gas turbine per unit time and sets the gas turbine output correction amount to 0 when the output change is smaller than a predetermined value.

According to a sixth aspect of the present invention, a combustor includes the above-described fuel control device.

According to a seventh aspect of the present invention, a gas turbine includes the above-described fuel control device.

According to an eighth aspect of the present invention, in a control method, a fuel control device calculates a temperature estimation value when a mixture of fuel and inflow air is burned using an atmospheric condition, an opening degree command value of a valve that controls the amount of air that is mixed with the fuel and burned, and an output prediction value calculated on the basis of a fuel control signal command value used for calculation of a total fuel flow rate flowing through a plurality of fuel supply systems, calculates a fuel distribution command value indicating a distribution of fuel output from the plurality of fuel supply systems on the basis of the temperature estimation value, and outputs the fuel distribution command value, and calculates each valve opening degree of a fuel flow rate control valve of the plurality of fuel supply systems on the basis of the fuel distribution command value and the total fuel flow rate based on the fuel control signal command value.

According to a ninth aspect of the present invention, a program causes a computer of a fuel control device to function as: a means that calculates a temperature estimation value when a mixture of fuel and inflow air is burned using an atmospheric condition, an opening degree command value of a valve that controls the amount of air that is mixed with the fuel and burned, and an output prediction value calculated on the basis of a fuel control signal command value used for calculation of a total fuel flow rate flowing through a plurality of fuel supply systems; a means that calculates a fuel distribution command value indicating a distribution of fuel output from the plurality of fuel supply systems on the basis of the temperature estimation value, and outputs the fuel distribution command value; and a means that calculates each valve opening degree of a fuel flow rate control valve of the plurality of fuel supply systems on the basis of the fuel distribution command value and the total fuel flow rate based on the fuel control signal command value.

Advantageous Effects of Invention

According to the fuel control device, the combustor, the gas turbine, the control method, and the program described above, it is possible to suppress a deviation between a target fuel system fuel ratio for the turbine inlet temperature and an actual fuel system fuel ratio even in a transient period of a load change.

DESCRIPTION OF EMBODIMENTS

First Embodiment

Hereinafter, a fuel control device according to a first embodiment of the present invention will be described with reference to FIGS. 1 to 5.

Figure 1:
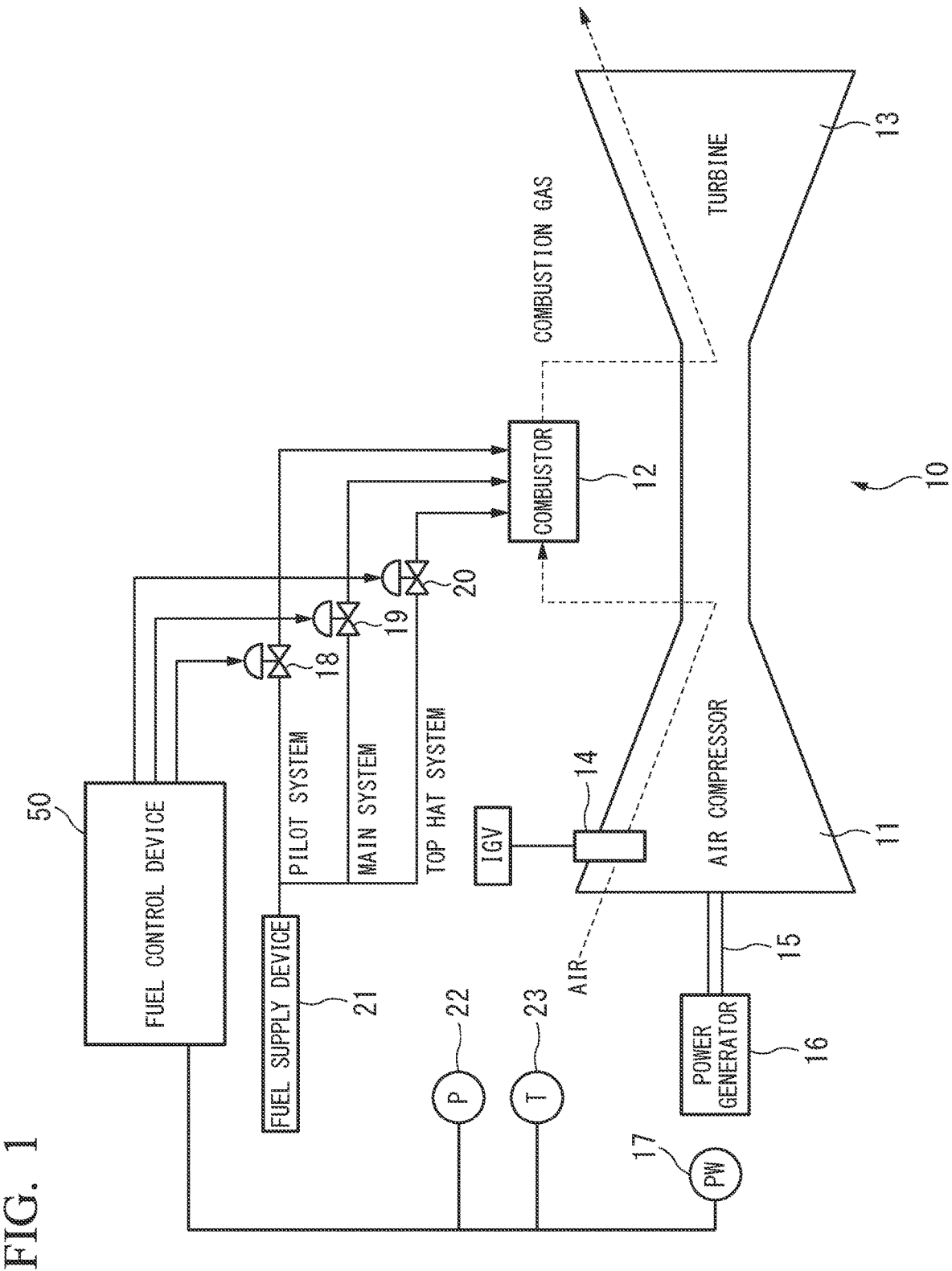
FIG. 1 is a system diagram of a gas turbine plant in a first embodiment according to the present invention.

FIG. 1 is a system diagram of a gas turbine plant in this embodiment.

The gas turbine plant of this embodiment includes a gas turbine 10, a power generator 16 that generates power through driving of the gas turbine 10, and a fuel control device 50 that controls a behavior of the gas turbine 10, as illustrated in FIG. 1. The gas turbine 10 and the power generator 16 are coupled to each other by a rotor 15.

The gas turbine 10 includes an air compressor 11 that compresses air to generate compressed air, a combustor 12 that mixes the compressed air with a fuel gas, burns the gas, and generates a combustion gas at a high temperature, and a turbine 13 that is driven by the combustion gas.

An IGV 14 is provided in the air compressor 11. The IGV 14 adjusts a flow of air into the air compressor 11. A pressure gauge 22 and a thermometer 23 are provided on an inlet side of the air compressor 11. The pressure gauge 22 measures atmospheric pressure and outputs the atmospheric pressure to the fuel control device 50. The thermometer 23 measures atmospheric temperature and outputs the atmospheric temperature to the fuel control device 50.

The combustor 12 is connected to a fuel supply device 21 that supplies a fuel to the combustor 12. The fuel is supplied from a plurality of fuel supply systems (a pilot system, a main system, and a top hat system) to the combustor 12. Accordingly, valves that adjust a flow rate of the fuel for the respective fuel systems, that is, a pilot system fuel flow rate control valve 18, a main system fuel flow rate control valve 19, a top hat system fuel flow rate control valve 20 are provided between the fuel supply device 21 and the combustor 12.

The power generator 16 includes a power meter 17, which measures the power generated by the power generator 16 and outputs the measure power to the fuel control device 50.

The fuel control device 50 determines a distribution ratio of the fuel to be assigned to each fuel system and adjusts valve opening degrees of the fuel flow rate control valves included in the respective fuel supply systems. That is, the fuel control device 50 adjusts valve opening degrees of the pilot system fuel flow rate control valve 18, the main system fuel flow rate control valve 19, and the top hat system fuel flow rate control valve 20 to control fuel flow rates of the fuel flowing from nozzles of each system into the combustor.

Figure 2:
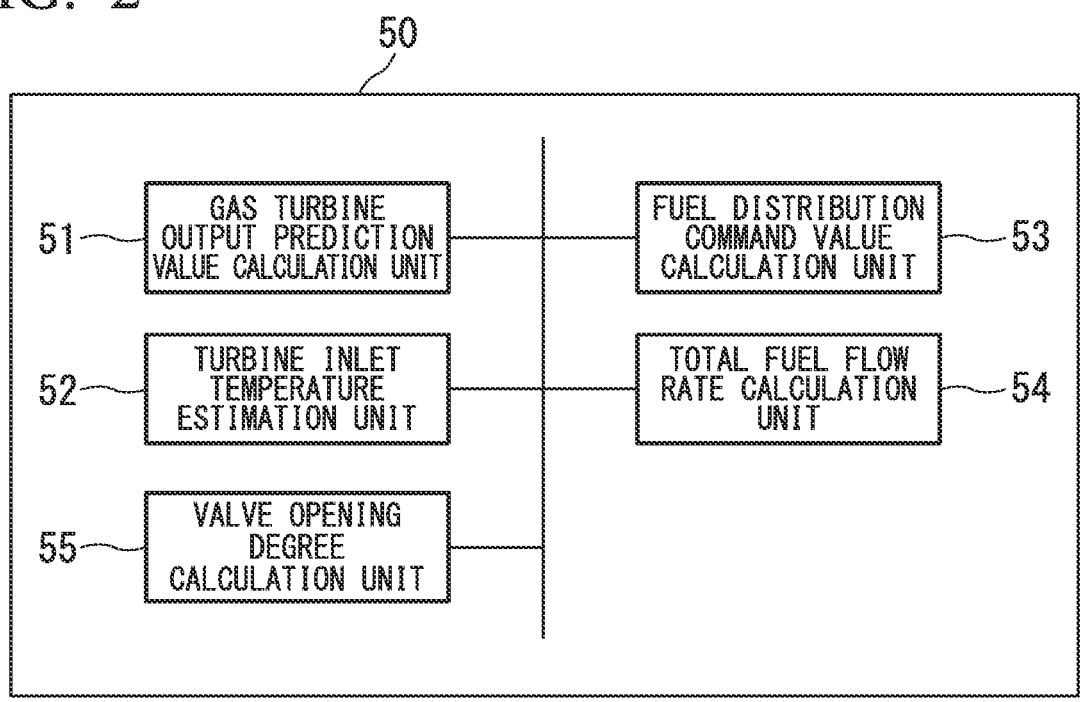
FIG. 2 is a block diagram illustrating an example of a fuel control device in the first embodiment according to the present invention.

FIG. 2 is a block diagram illustrating an example of the fuel control device in the first embodiment according to the present invention.

A gas turbine output prediction value calculation unit 51 acquires a fuel control signal command value (CSO: Control Signal Output) from a gas turbine output control unit (not illustrated) that controls an output of the gas turbine, and calculates an output prediction value (MW) of the gas turbine on the basis of the CSO. The fuel control signal command value (CSO) is a control output signal for controlling the fuel flow rate that is supplied to the combustor. The calculation of the gas turbine output prediction value is performed, for example, as follows. A table or a function in which the CSO and the gas turbine output prediction value are associated with each other is stored in a storage unit (not illustrated) included in the fuel control device 50, and the gas turbine output prediction value calculation unit 51 reads the table on the basis of the acquired CSO and acquires a gas turbine output prediction value. Alternatively, if there is no output prediction value for a desired CSO in the table, the gas turbine output prediction value calculation unit 51 performs interpolation calculation using a read gas turbine output prediction value to calculate the gas turbine output prediction value. A correspondence between the CSO and the gas turbine output prediction value is determined by performing, for example, a simulation or an experiment in advance. The storage unit may be a storage device connected to the fuel control device 50.

A turbine inlet temperature estimation unit 52 estimates a temperature of the combustion gas at the inlet of the turbine. More particularly, the turbine inlet temperature estimation unit 52 acquires the atmospheric pressure from the pressure gauge 22, the atmospheric temperature from thermometer 23, an IGV opening degree command value from an IGV control device (not illustrated), and the gas turbine output prediction value from the gas turbine output prediction value calculation unit 51, and estimates the temperature of the combustion gas at the inlet of the turbine (a turbine inlet temperature estimation value) on the basis of such values. A method of estimating the turbine inlet temperature is described in, for example, Japanese Unexamined Patent Application, First Publication No. 2007-77867. An overview thereof will be described. A table in which a relationship between the gas turbine output and the turbine inlet temperature at each IGV opening degree is defined, a table in which a relationship between the atmospheric temperature and the gas turbine output at each IGV opening degree is defined, and the like are prepared in advance. In the described method, a relationship among the IGV opening degree, the atmospheric temperature, the gas turbine output, and the turbine inlet temperature is obtained using the tables. In the described method, a relationship between the gas turbine output and the turbine inlet temperature considering an atmospheric pressure ratio is obtained using a predetermined method, and the turbine inlet temperature corresponding to the gas turbine output at a predetermined IGV opening degree considering an atmospheric condition is estimated using this correspondence relationship.

A fuel distribution command value calculation unit 53 reads a distribution ratio for distribution to a pilot nozzle from a table or a function in which the turbine inlet temperature estimation value and, for example, a distribution ratio of fuel supplied to the pilot nozzle are associated with each other, which is stored in the storage unit, on the basis of the turbine inlet temperature estimation value estimated by the turbine inlet temperature estimation unit 52. Similarly, the fuel distribution command value calculation unit 53 reads a distribution ratio for distribution to a top hat nozzle from a table or a function in which the turbine inlet temperature estimation value and a distribution ratio of fuel supplied to the top hat nozzle are associated with each other. If the distribution ratio is expressed as a percentage, the fuel distribution command value calculation unit 53 subtracts a sum of the distribution ratios of the pilot nozzle and the top hat nozzle from 100% to calculate a distribution ratio of the fuel supplied to another main nozzle. If the fuel distribution command value calculation unit 53 calculates the distribution ratio for distribution to each fuel system, the fuel distribution command value calculation unit 53 outputs the distribution ratio (the fuel distribution command value) to the valve opening degree calculation unit 55. If the distribution ratio of the fuel at the turbine inlet temperature estimation value, which is a target, is not read from, for example, the table in which the turbine inlet temperature estimation value and each distribution ratio of the fuel are determined, the distribution ratio may be calculated using interpolation calculation.

The total fuel flow rate calculation unit 54 acquires the CSO from the gas turbine output control unit and calculates a total fuel flow rate indicated by the CSO. The total fuel flow rate indicates a fuel flow rate that is supplied to the combustor, and is a sum of fuel that is distributed to respective systems. The total fuel flow rate is calculated from a correspondence table or a function of the CSO and the total fuel flow rate value, which is recorded in the storage unit. The total fuel flow rate calculation unit 54 outputs information on the total fuel flow rate to the valve opening degree calculation unit 55.

The valve opening degree calculation unit 55 calculates the valve opening degree of the flow rate control valve provided in each fuel system on the basis of the fuel distribution command value and the total fuel flow rate. Specifically, the valve opening degree calculation unit 55 multiplies the total fuel flow rate by the distribution ratio for distribution to each system to calculate a fuel flow rate that is supplied to each system. The valve opening degree calculation unit 55 calculates a valve opening degree of each flow rate control valve using a correspondence table or a function of the fuel flow rate and the valve opening degree command value, which is prepared for each flow rate control valve. The valve opening degree calculation unit 55 controls the pilot system fuel flow rate control valve 18, the main system fuel flow rate control valve 19, and the top hat system fuel flow rate control valve 20 on the basis of the calculated valve opening degree. The correspondence table or the function of the fuel flow rate and the valve opening degree command value is stored in the storage unit.

Figure 3:
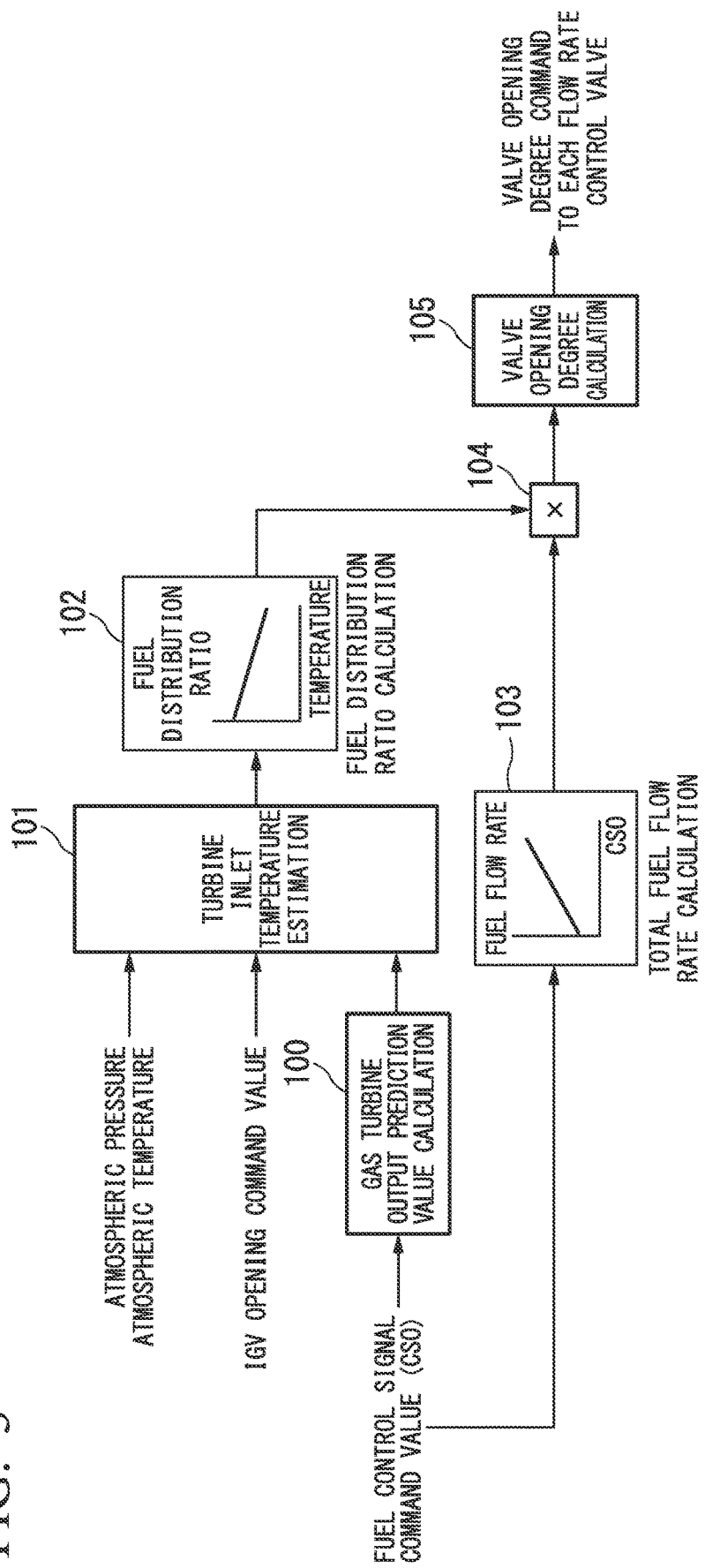
FIG. 3 is a diagram illustrating an example of a fuel distribution control in the first embodiment according to the present invention.

FIG. 3 is a diagram illustrating an example of a fuel distribution control in the first embodiment according to the present invention.

The fuel distribution control of this embodiment will be described with reference to FIG. 3.

First, the gas turbine output prediction value calculation unit 51 acquires a CSO from the gas turbine output control unit. The gas turbine output prediction value calculation unit 51 calculates a gas turbine output prediction value by referring to a prerecorded correspondence table of the CSO and the gas turbine output prediction value using the acquired CSO (100).

Then, the turbine inlet temperature estimation unit 52 acquires an atmospheric pressure from the pressure gauge 22 and an atmospheric temperature from the thermometer 23. Further, the turbine inlet temperature estimation unit 52 acquires an IGV opening command value from the IGV control device. Further, the turbine inlet temperature estimation unit 52 acquires a turbine inlet temperature estimation value estimated by the gas turbine output prediction value calculation unit 51. The turbine inlet temperature estimation unit 52 estimates a turbine inlet temperature by a predetermined method using such parameters (101).

Then, the fuel distribution command value calculation unit 53 calculates a distribution ratio of fuel that is supplied to each of the fuel supply systems on the basis of the turbine inlet temperature (102). The fuel distribution command value calculation unit 53 outputs information of the distribution ratio to the valve opening degree calculation unit 55.

On the other hand, the total fuel flow rate calculation unit 54 acquires the CSO from the gas turbine output control unit and calculates the total fuel flow rate (103). The total fuel flow rate calculation unit 54 outputs the information of the total fuel flow rate to the valve opening degree calculation unit 55.

The valve opening degree calculation unit 55 multiplies the total fuel flow rate by the distribution ratio for each fuel system to calculate the fuel flow rate that is supplied to each fuel system (104). The valve opening degree calculation unit 55 calculates a valve opening degree of the flow rate control valve of each system from the fuel flow to each system (105). The valve opening degree calculation unit 55 controls each flow rate control valve on the basis of the calculated valve opening command value.

Figure 4:
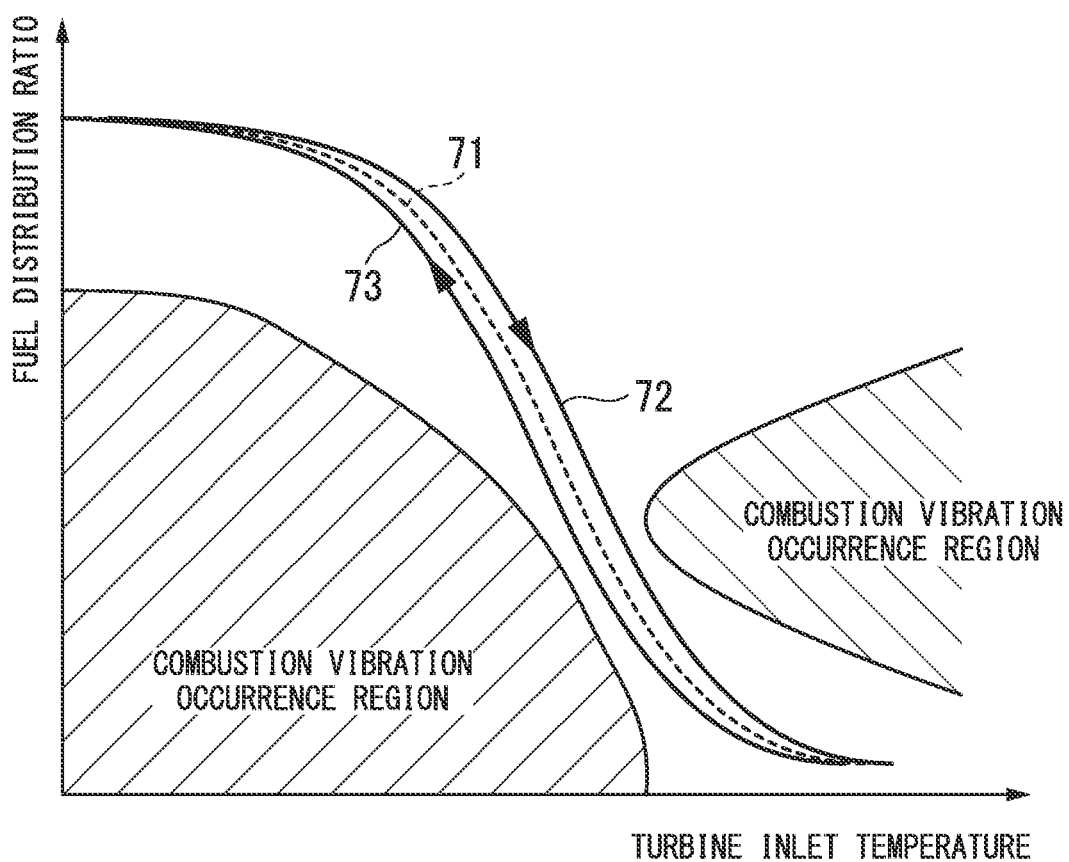
FIG. 4 is a diagram illustrating an example of a result of applying the fuel distribution control in the first embodiment according to the present invention.

FIG. 4 is a diagram illustrating an example of a result of applying the fuel distribution control in the first embodiment according to the present invention.

Figure 15:
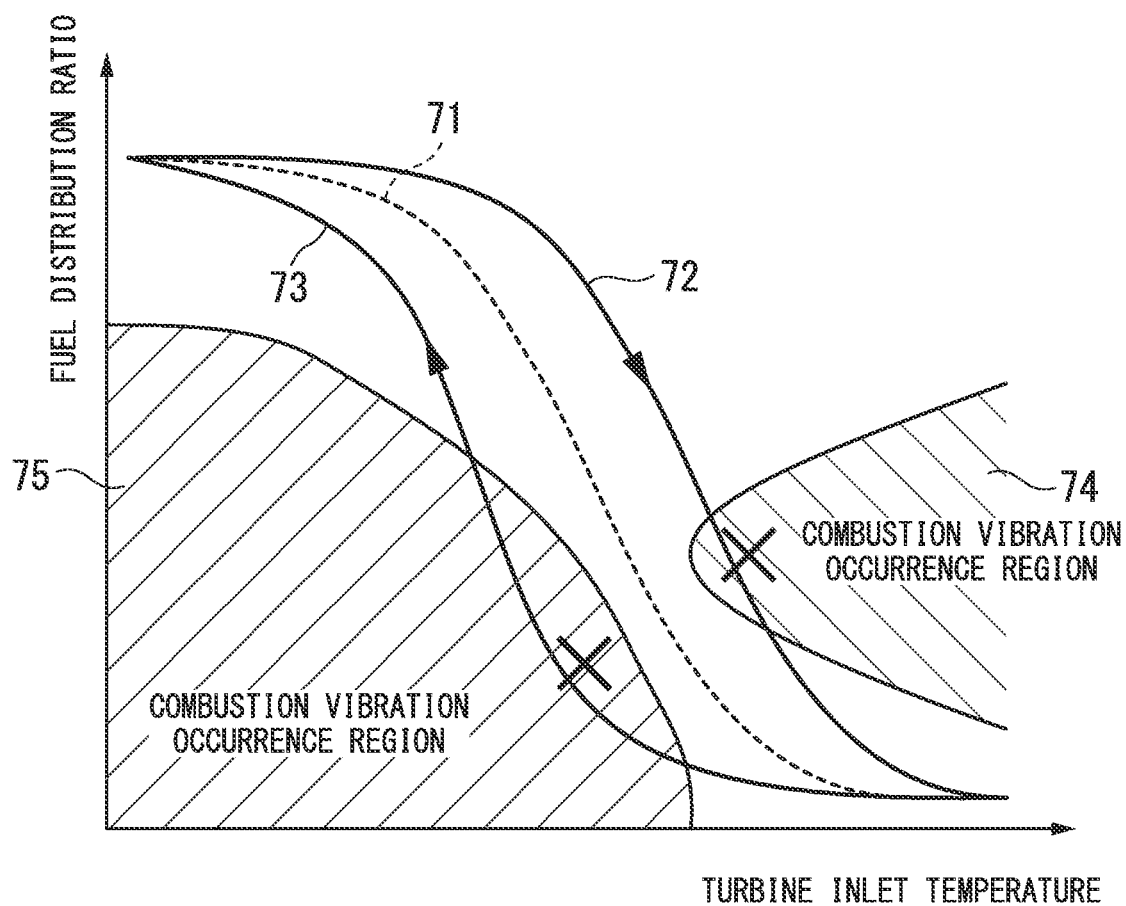
FIG. 15 is a diagram illustrating an example of a relationship between a fuel distribution ratio and a turbine inlet temperature at the time of a load change.

As illustrated in FIG. 4, when the fuel distribution control according to this embodiment is applied to increase or decrease a load, either an operation line 72 when the load increases or an operation line 73 when the load decreases is not included in a combustion vibration occurrence region, unlike the result of the related art described with reference to FIG. 15.

In the method of the related art, the turbine inlet temperature estimation value is determined according to an actual output of the gas turbine. In this case, the fuel control device of the related art determines a distribution ratio of fuel to actually perform control of the supply of the fuel to each system. As a result, a delay is caused due to various factors until the output of the gas turbine becomes a desired value. The various factors include, for example, a mechanical delay (a valve operation delay, a pressure response delay, or a combustion delay) or a control delay such as time consumed for, for example, filter processing for removing noise from a signal. According to the method of the related art, when the fluctuation of the load is large, the fuel distribution ratio is determined on the basis of the turbine inlet temperature estimation value according to the actual output of the gas turbine. Accordingly, the output value of the gas turbine has already changed when the valve opening degree is actually controlled on the basis of the determined distribution ratio, and the control using the previously calculated valve opening degree may not fit the actual situation.

However, according to this embodiment, by calculating the turbine inlet temperature estimation value using a prediction value of the gas turbine output on the basis of the CSO, it is possible to proactively compensate for a time delay of the turbine inlet temperature estimation value caused by feedback of an actual gas turbine output value, which may occur in the method of the related art, to calculate the turbine inlet temperature estimation value. Accordingly, it is possible to decrease a deviation between an operation line and a target operation line even in a transient period of a load change and to prevent the occurrence of combustion vibration.

Figure 5:
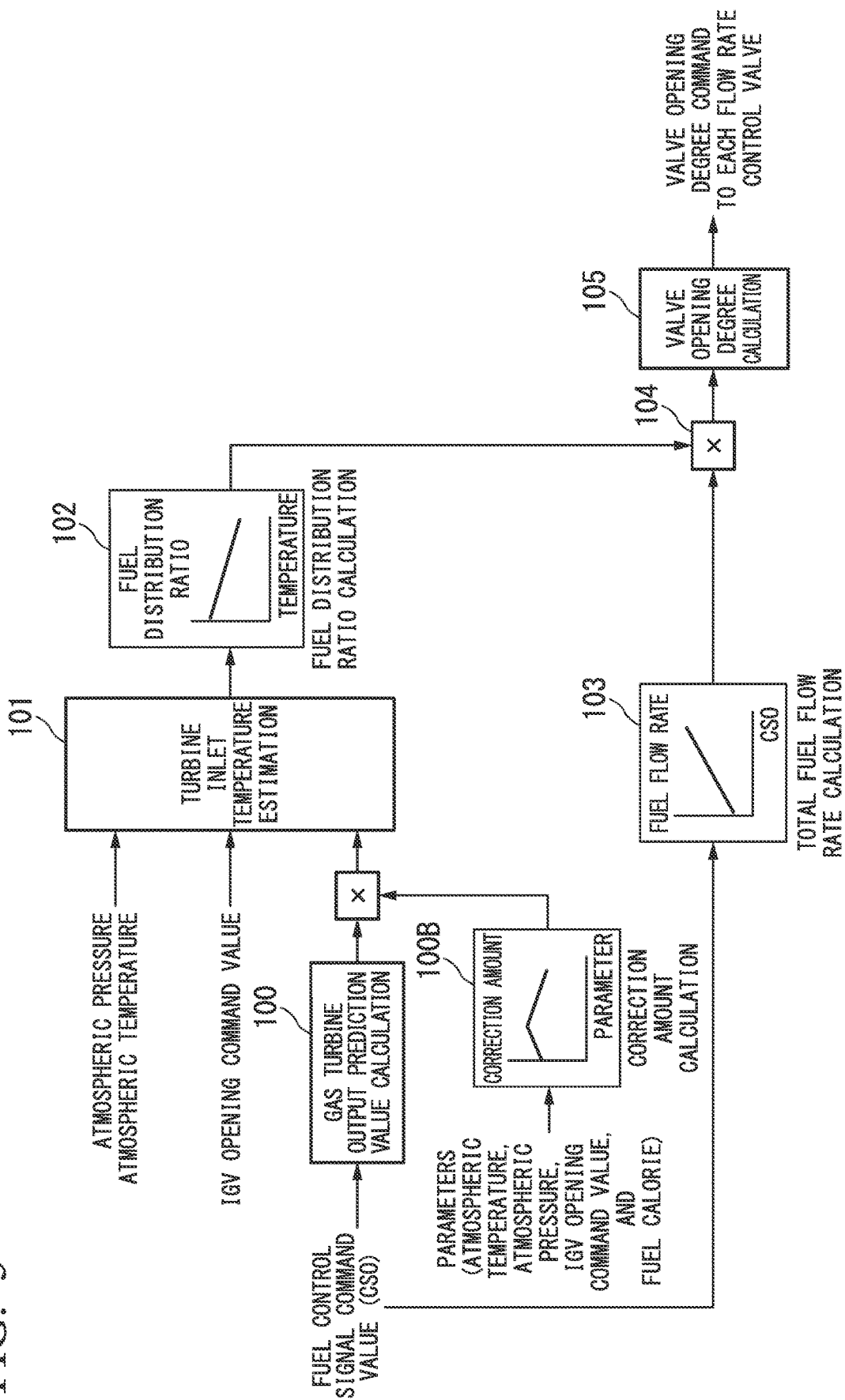
FIG. 5 is a diagram illustrating a modification example of the fuel distribution control in the first embodiment according to the present invention.

FIG. 5 is a diagram illustrating a modification example of a fuel distribution control in the first embodiment according to the present invention.

In this modification example, a parameter other than the CSO is used for calculation of the output prediction value of the gas turbine. A specific parameter is at least one of an atmospheric temperature, an atmospheric pressure, an IGV opening command value, and a fuel calorie. Other processes are the same as those in the first embodiment.

The gas turbine output prediction value calculation unit 51 calculates the gas turbine output prediction value on the basis of the CSO (100). Further, the gas turbine output prediction value calculation unit 51 acquires at least one of the above-described parameters. For the respective parameters, the gas turbine output prediction value calculation unit 51 acquires the atmospheric pressure from the pressure gauge 22, the atmospheric temperature from the thermometer 23, the IGV opening command value from the IGV control device, and the fuel calorie from a calorimeter (not illustrated) provided in the fuel system. The gas turbine output prediction value calculation unit 51 reads a table in which a value of each parameter and a correction amount of the gas turbine output prediction value are associated with each other, which is prepared for each parameter in advance, from the storage unit using the acquired parameter, and calculates a correction amount on the basis of the table (100B). The gas turbine output prediction value calculation unit 51 multiplies (or adds) the gas turbine output prediction value calculated on the basis of the CSO by (to) the correction amount to obtain a gas turbine output prediction value after correction.

According to this modification example, it is possible to calculate the fuel distribution ratio on the basis of the gas turbine output prediction value corresponding to an actual atmospheric temperature, an actual atmospheric pressure, an actual IGV opening command value, and an actual fuel calorie. Therefore, it is possible to perform control of the fuel flow rate which further reflects a real environment and to further suppress a risk of combustion fluctuation. A combination of the parameters can be used.

Second Embodiment

Hereinafter, a fuel control device according to a second embodiment of the present invention will be described with reference to FIGS. 6 and 7.

Figure 6:
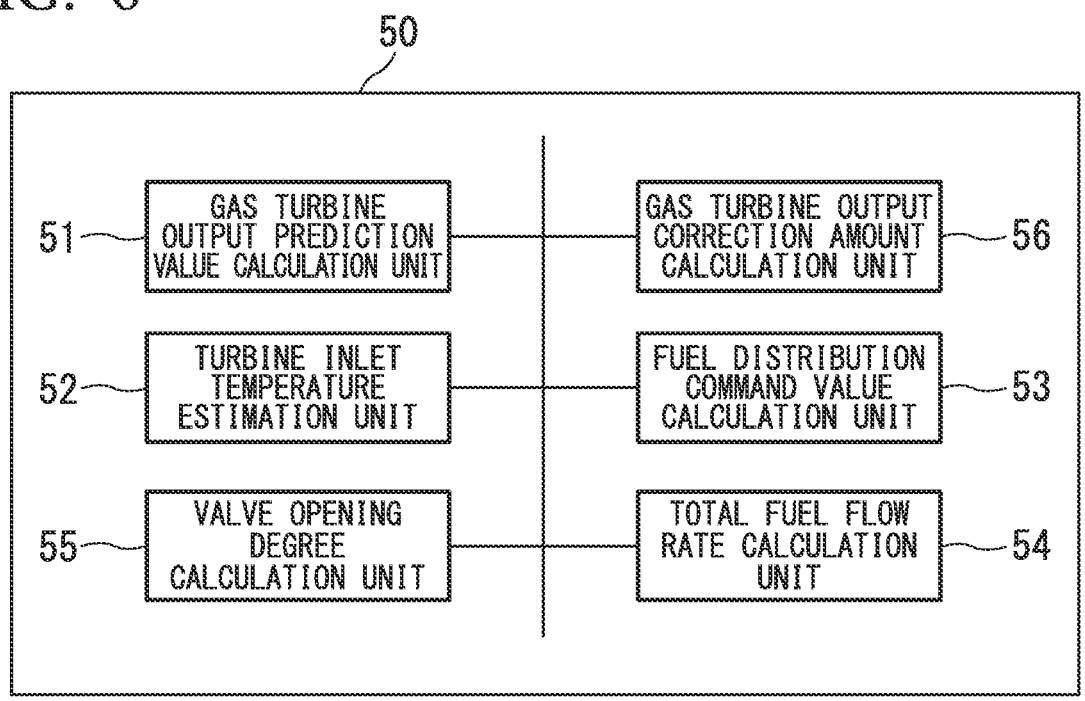
FIG. 6 is a block diagram illustrating an example of a fuel control device in a second embodiment according to the present invention.

FIG. 6 is a block diagram illustrating an example of a fuel control device of this embodiment.

As illustrated in FIG. 6, a fuel control device 50 in this embodiment includes a gas turbine output correction amount calculation unit 56. Further, a method of calculating an expected output value of the gas turbine in the gas turbine output prediction value calculation unit 51 is different from that in the first embodiment. Other configurations are the same as in the first embodiment.

The gas turbine output correction amount calculation unit 56 acquires a CSO from the gas turbine output control unit and calculates a correction amount for the output value of the gas turbine on the basis of the CSO. For the calculation of the gas turbine output value correction amount, a table in which the CSO and the gas turbine output value correction amount are associated with each other or a function including a differentiator is recorded in a storage unit in advance, and the gas turbine output correction amount calculation unit 56 reads the table or the like using the acquired CSO and obtains the gas turbine output value correction amount.

Then, the gas turbine output correction amount calculation unit 56 reads a predetermined weighting coefficient P from the storage unit and multiplies the gas turbine output correction amount acquired from the gas turbine output correction amount calculation unit 56 by the weighting coefficient P. The gas turbine output correction amount calculation unit 56 outputs the correction amount multiplied by the coefficient P to the gas turbine output prediction value calculation unit 51.

The gas turbine output prediction value calculation unit 51 acquires an output value (a gas turbine output value) of the power generator 16 measured by the power meter 17. The gas turbine output prediction value calculation unit 51 calculates the gas turbine output prediction value from the gas turbine output value and the gas turbine output correction amount acquired from the gas turbine output correction amount calculation unit 56.

Figure 7:
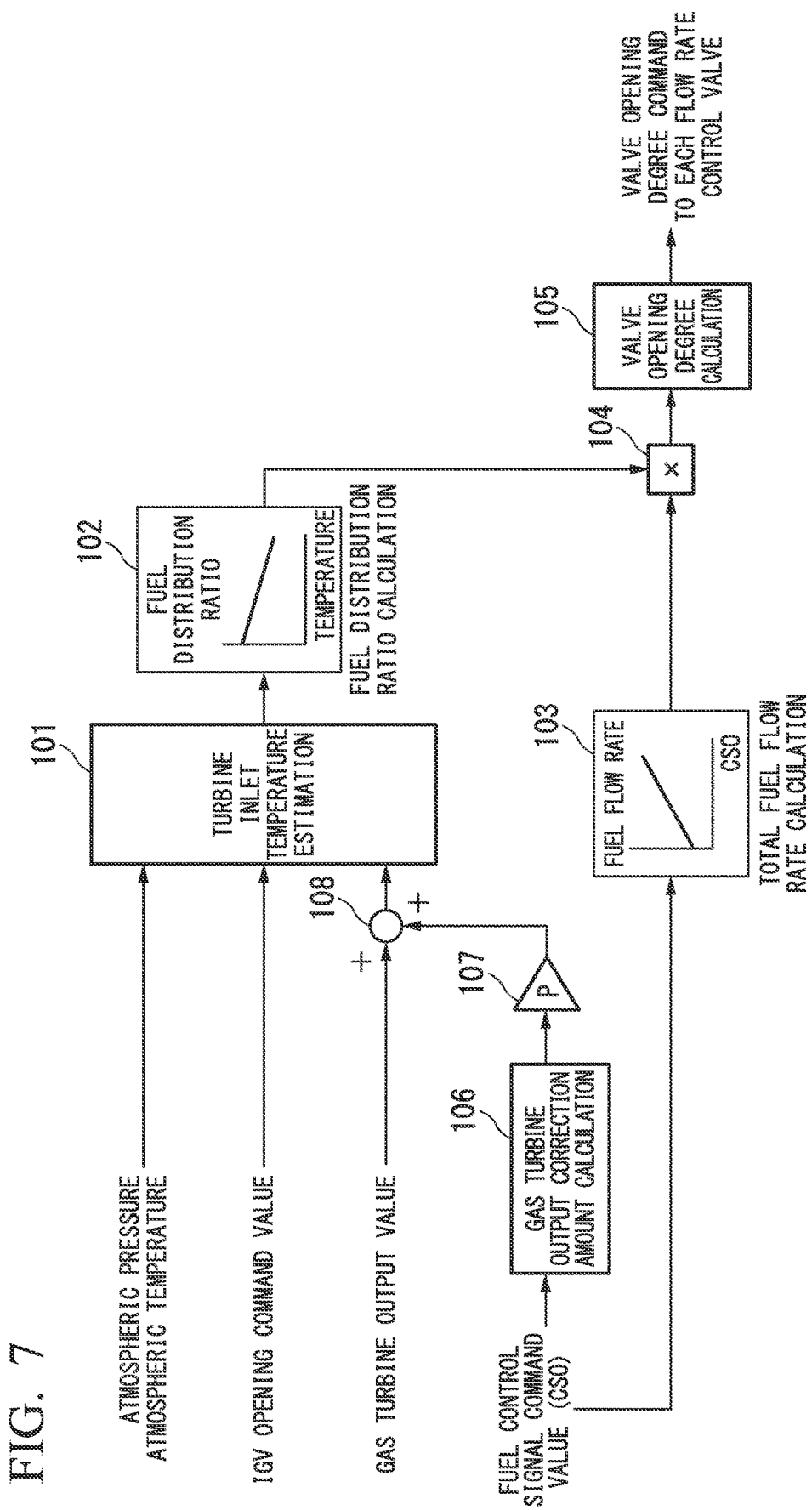
FIG. 7 is a diagram illustrating an example of a fuel distribution control in the second embodiment according to the present invention.

FIG. 7 is a diagram illustrating an example of a fuel distribution control in the second embodiment according to the present invention.

The fuel distribution control of this embodiment will be described with reference to FIG. 7.

First, the gas turbine output correction amount calculation unit 56 acquires a CSO from the gas turbine output control unit. The gas turbine output correction amount calculation unit 56 calculates a gas turbine output correction amount by referring to a prerecorded correspondence table of the CSO and the gas turbine output correction amount using the acquired CSO (106). Alternatively, if there is no output correction amount corresponding to a desired CSO in the table, the gas turbine output correction amount calculation unit 56 may calculate the output correction amount through interpolation calculation.

Then, the gas turbine output correction amount calculation unit 56 reads a predetermined coefficient P from the storage unit, and multiplies the gas turbine output correction amount by the weighting coefficient P (107). The gas turbine output correction amount calculation unit 56 outputs the correction amount multiplied by the weighting coefficient P to the gas turbine output prediction value calculation unit 51. Further, the gas turbine output prediction value calculation unit 51 acquires a gas turbine output value from the power meter 17. The gas turbine output prediction value calculation unit 51 adds the gas turbine output value to the correction amount acquired from the gas turbine output correction amount calculation unit 56 to calculate a gas turbine output prediction value (108). Since subsequent processes are the same as those in the first embodiment, description thereof will be omitted.

According to this embodiment, on the basis of an actually measured value of the gas turbine output, a turbine inlet temperature is estimated using the gas turbine output prediction value that is corrected on the basis of the CSO. A distribution ratio of fuel to each fuel system is determined using the turbine inlet temperature. Accordingly, it is possible to perform distribution ratio control for fuel that is more suitable for an actual situation, and further reduce a risk of the occurrence of combustion vibration. For example, there is a case in which a correspondence relationship between the CSO and the gas turbine output prediction value is changed from the time of design, for example, due to aging degradation. In this embodiment, since an actual gas turbine output value reflecting an actual situation such as the aging degradation is used, the accuracy of the gas turbine output prediction value further increases.

Third Embodiment

Hereinafter, a fuel control device according to a third embodiment of the present invention will be described with reference to FIGS. 8 and 9.

Figure 8:
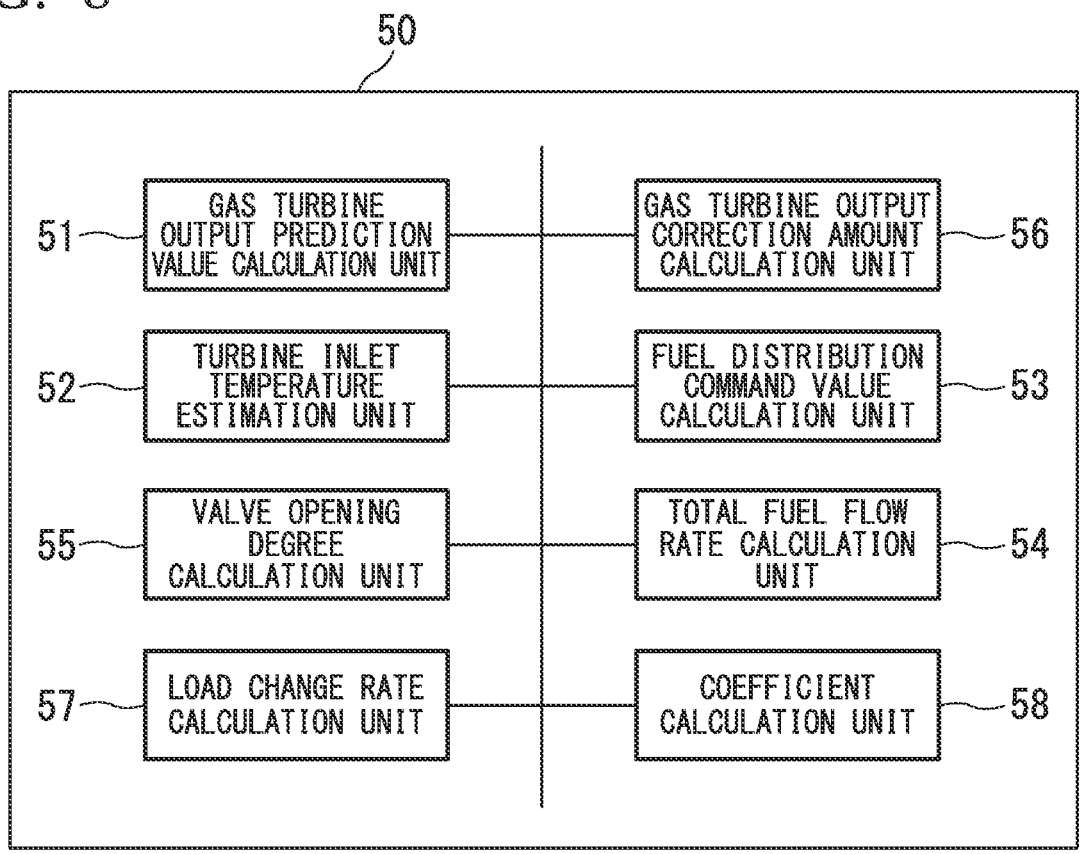
FIG. 8 is a block diagram illustrating an example of a fuel control device in a third embodiment according to the present invention.

FIG. 8 is a block diagram illustrating an example of a fuel control device of this embodiment.

As illustrated in FIG. 8, a fuel control device 50 in this embodiment includes a load change rate calculation unit 57 and a coefficient calculation unit 58. Other configurations are the same as those in the second embodiment.

The load change rate calculation unit 57 acquires an output measurement value of the power generator 16 from the power meter 17. The load change rate calculation unit 57 calculates a change in load per unit time.

The coefficient calculation unit 58 acquires a weighting coefficient for the gas turbine output correction amount according to the load change rate calculated by the load change rate calculation unit 57. For the calculation of the weighting coefficient, a table or a function in which the load change rate and the weighting coefficient are associated with each other is recorded in the storage unit in advance, and the coefficient calculation unit 58 reads the table or the like and obtains a weighting coefficient corresponding to the calculated load change.

A target rate of an output change for achieving a target output of the gas turbine which changes minute by minute with respect to the load change may be used in place of the load change rate instead of calculating the load change rate based on an actually measured value of the load in order to acquire the weighting coefficient. A value of this target rate is a value that the gas turbine output control unit calculates in a process of determining the CSO. The load change rate calculation unit 57 acquires a predetermined target rate of the output change with respect to the load change from the gas turbine output control unit. The coefficient calculation unit 58 acquires the weighting coefficient from a correspondence table of the target rate and the weighting coefficient.

Figure 9:
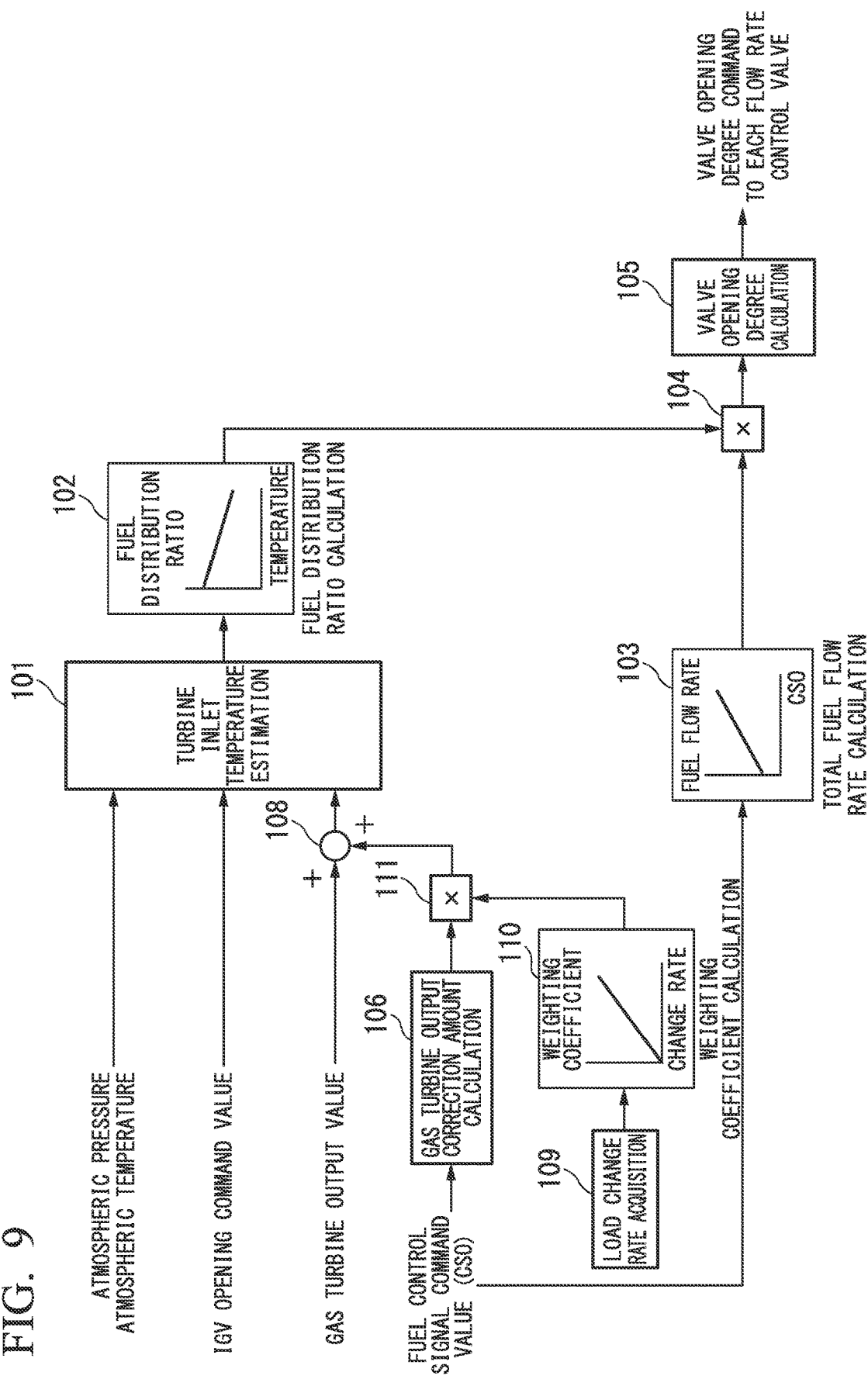
FIG. 9 is a diagram illustrating an example of a fuel distribution control in the third embodiment according to the present invention.

FIG. 9 is a diagram illustrating an example of a fuel distribution control in the third embodiment according to the present invention.

The fuel distribution control of this embodiment will be described with reference to FIG. 9.

First, the load change rate calculation unit 57 calculates a load change rate (109). The load change rate calculation unit 57 outputs the calculated load change rate to the coefficient calculation unit 58. The coefficient calculation unit 58 acquires a weighting coefficient according to the load change rate from a table or a function in which the load change rate and the weighting coefficient are associated with each other on the basis of the acquired load change rate (110), and outputs the weighting coefficient to the gas turbine output correction amount calculation unit 56.

The gas turbine output correction amount calculation unit 56 calculates a gas turbine output correction amount on the basis of a CSO, as in the second embodiment (106). The gas turbine output correction amount calculation unit 56 multiplies the calculated gas turbine output correction amount by the weighting coefficient according to the load change rate acquired from the coefficient calculation unit 58 to calculate a gas turbine output correction amount according to the load change rate (111). The gas turbine output correction amount calculation unit 56 outputs the gas turbine output correction amount according to the calculated load change rate to the gas turbine output prediction value calculation unit 51. The gas turbine output prediction value calculation unit 51 adds the gas turbine output value to the correction amount acquired from the gas turbine output correction amount calculation unit 56 to calculate a gas turbine output prediction value (108). Since subsequent processes are the same as those in the first embodiment, description thereof will be omitted.

If a target rate is used in place of the load change rate, the load change rate calculation unit 57 acquires the target rate from the gas turbine output control unit (109), and outputs the target rate to the coefficient calculation unit 58. The coefficient calculation unit 58 calculates a weighting coefficient according to the target rate from a table or a function in which the target rate and the weighting coefficient are associated with each other (110), and outputs the weighting coefficient to the gas turbine output correction amount calculation unit 56. Subsequent processes are the same as those in a case in which the load change rate is used.

According to this embodiment, it is possible to obtain a gas turbine output correction amount according to a load change rate. Accordingly, it is possible to perform a distribution ratio control of the fuel on the basis of a more accurate turbine inlet temperature estimation value and further reduce a risk of occurrence of combustion vibration.

Fourth Embodiment

Hereinafter, a fuel control device according to a fourth embodiment of the present invention will be described with reference to FIGS. 10 to 11.

Figure 10:
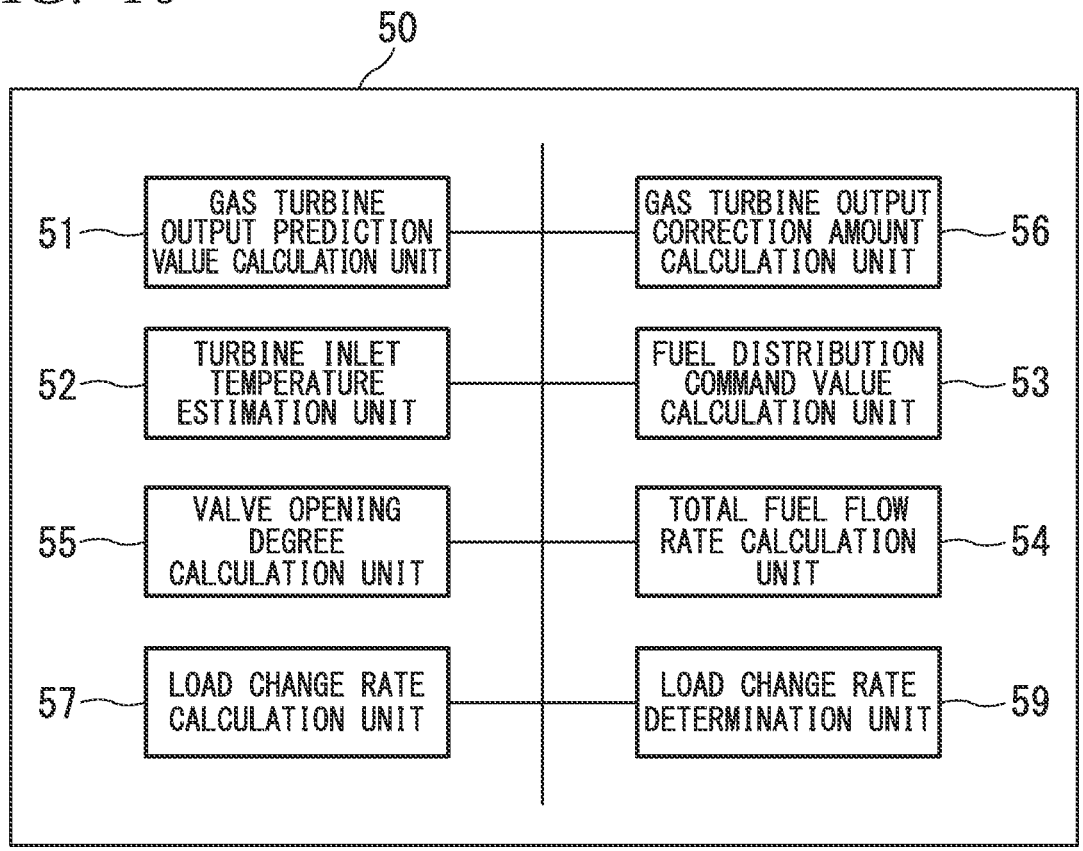
FIG. 10 is a block diagram illustrating an example of a fuel control device in a fourth embodiment according to the present invention.

FIG. 10 is a block diagram illustrating an example of the fuel control device of this embodiment.

As illustrated in FIG. 10, a fuel control device 50 in this embodiment includes a load change rate determination unit 59 in place of the coefficient calculation unit 58. Other configurations are the same as that in the third embodiment.

The load change rate determination unit 59 acquires a load change rate calculated by the load change rate calculation unit 57 and compares the value with a threshold value Q, which is set in advance and recorded in the storage unit. If the load change rate is equal to or greater than the threshold value Q, the load change rate determination unit 59 outputs a predetermined weighting coefficient P to the gas turbine output correction amount calculation unit 56. Further, if the load change rate is smaller than the threshold value Q, the load change rate determination unit 59 sets a value "0" as a weighting coefficient and outputs the weighting coefficient to the gas turbine output correction amount calculation unit 56. The threshold value Q is a value for determining whether a correction amount calculated by the gas turbine output correction amount calculation unit 56 is reflected in a gas turbine output value.

Figure 11:
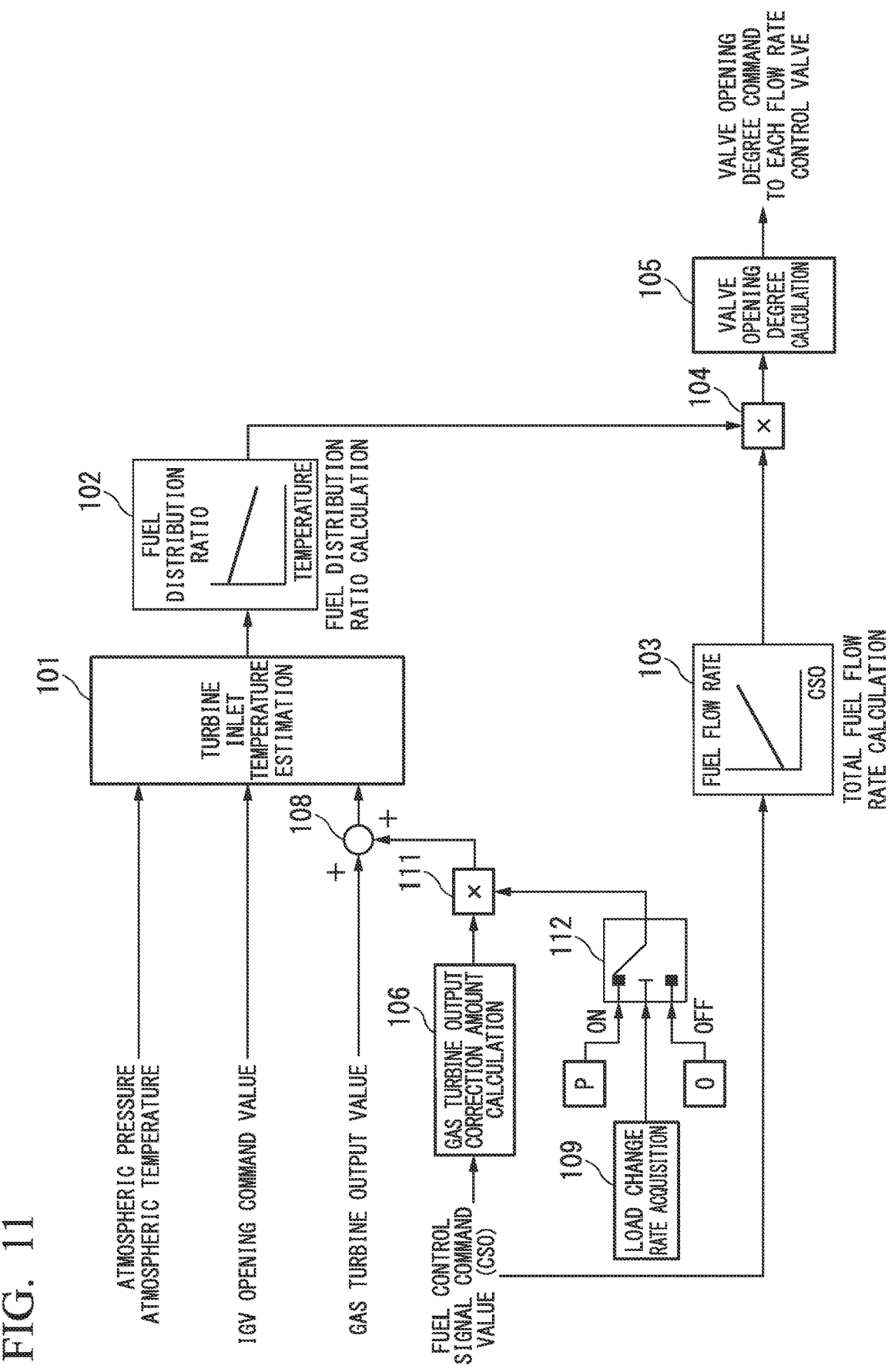
FIG. 11 is a diagram illustrating an example of a fuel distribution control in the fourth embodiment according to the present invention.

FIG. 11 is a diagram illustrating an example of a fuel distribution control in the fourth embodiment according to the present invention.

A fuel distribution control of this embodiment will be described with reference to FIG. 11.

First, the load change rate calculation unit 57 calculates a load change rate (109). The load change rate calculation unit 57 outputs the calculated load change rate to the load change rate determination unit 59. The load change rate determination unit 59 determines whether the acquired load change rate is equal to or greater than the threshold value Q. If the acquired load change rate is equal to or greater than the threshold value Q, the load change rate determination unit 59 reads the weighting coefficient P from the storage unit and outputs the weighting coefficient P to the gas turbine output correction amount calculation unit 56. Further, if the acquired load change rate is smaller than the threshold value Q, the load change rate determination unit 59 outputs the value "0" to the gas turbine output correction amount calculation unit 56 (112).

The gas turbine output correction amount calculation unit 56 calculates a gas turbine correction amount on the basis of a CSO, similar to the second and third embodiments, and multiplies the gas turbine correction amount by a weighting coefficient acquired from the load change rate determination unit 59 to calculate the gas turbine output correction amount (111). The gas turbine output correction amount calculation unit 56 outputs the calculated gas turbine output correction amount to the gas turbine output prediction value calculation unit 51. If the load change rate is smaller than the threshold value Q, the weighting coefficient is "0". Accordingly, the correction amount output by the gas turbine output correction amount calculation unit 56 is "0".

The gas turbine output prediction value calculation unit 51 adds the gas turbine output value to the correction amount acquired from the gas turbine output correction amount calculation unit 56 to calculate a gas turbine output prediction value (108). Since the correction amount is 0 if the load change rate is smaller than the threshold value Q, the gas turbine output prediction value calculation unit 51 outputs an actually measured gas turbine output value to the turbine inlet temperature estimation unit 52. Since subsequent processes are the same as those in the first embodiment, description thereof will be omitted.

According to this embodiment, it is possible to correct the gas turbine output value with the correction amount based on the CSO only in the case of an intended load change on the basis of a magnitude of the load change rate. In actual operation, even when the output of the gas turbine is constant, a fuel calorie value change, a fuel supply pressure change, or the like may occur, and the CSO may fluctuate with such a change. Then, in the case of the first to third embodiments, the turbine inlet temperature estimation value fluctuates under an influence of the fluctuating CSO. According to this embodiment, it is possible to reduce the risk of occurrence of combustion vibration caused by inappropriately changing the fuel distribution ratio with respect to such outer circumference conditions.

Fifth Embodiment

Hereinafter, a fuel control device according to a fifth embodiment of the present invention will be described with reference to FIGS. 12 to 13.

Figure 12:
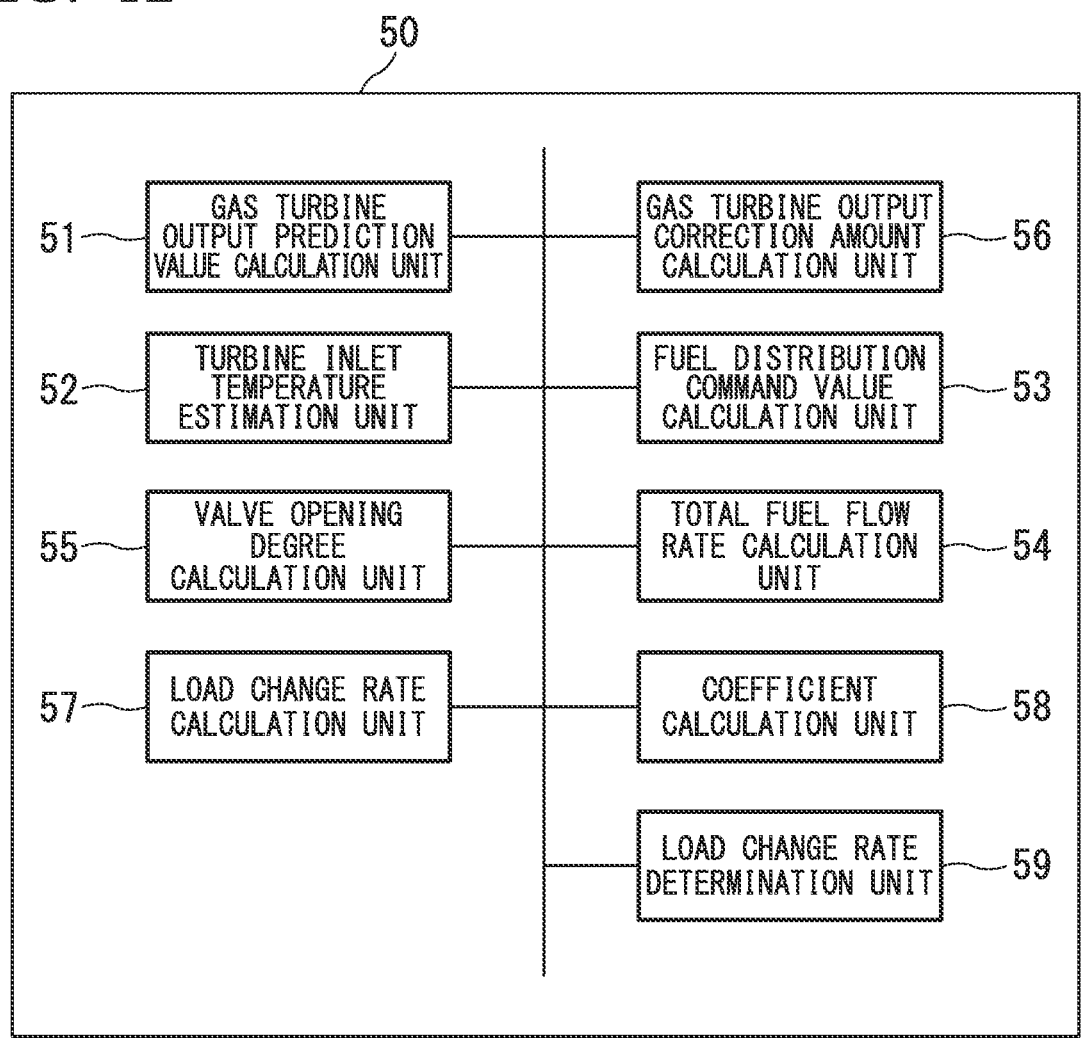
FIG. 12 is a block diagram illustrating an example of a fuel control device in a fifth embodiment according to the present invention.

FIG. 12 is a block diagram illustrating an example of a fuel control device of this embodiment.

As illustrated in FIG. 12, a fuel control device 50 in this embodiment includes a load change rate calculation unit 57, a coefficient calculation unit 58, and a load change rate determination unit 59. Other configurations are the same as those in the second embodiment.

Figure 13:
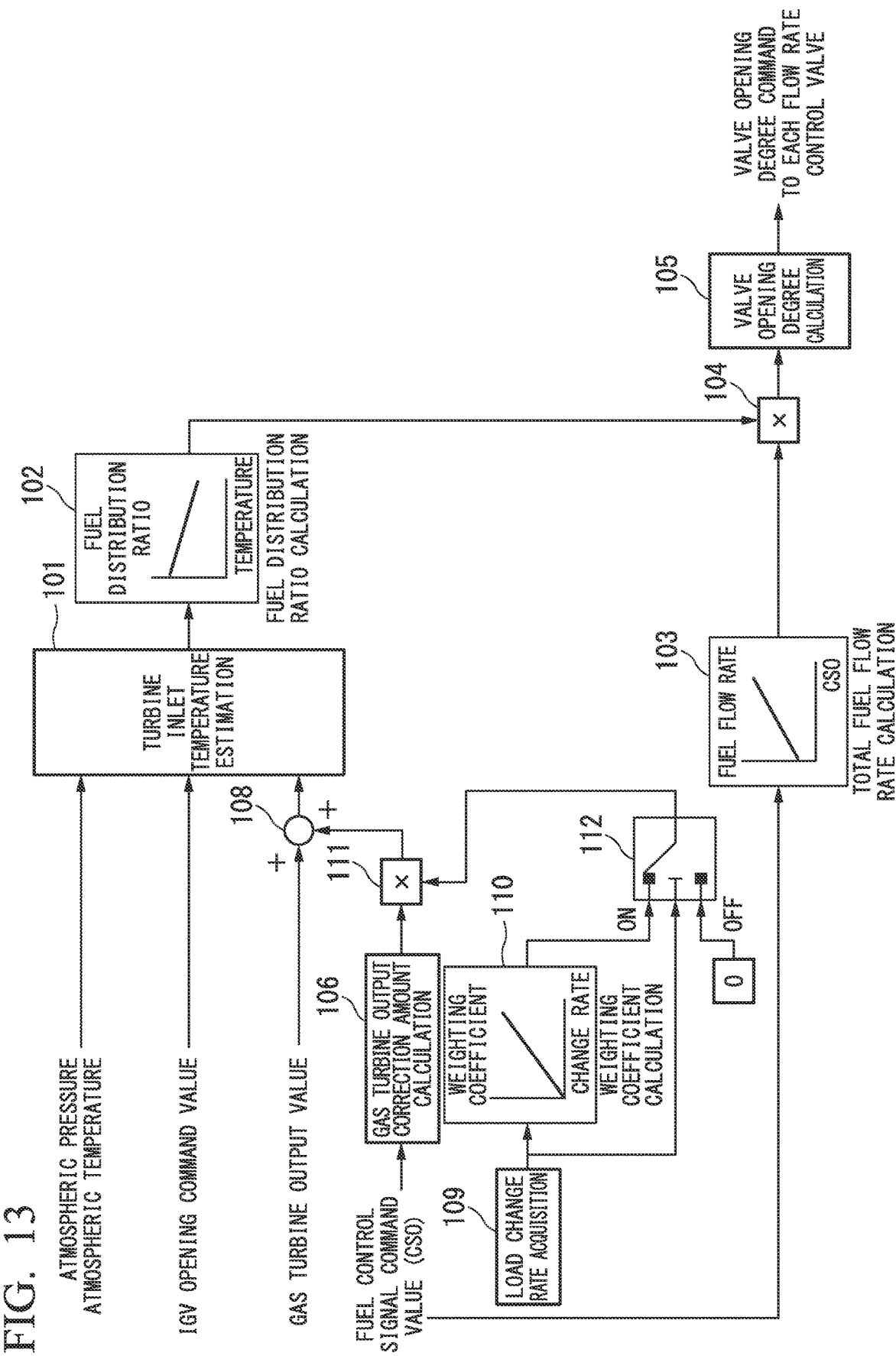
FIG. 13 is a diagram illustrating an example of a fuel distribution control in the fifth embodiment according to the present invention.
Figure 14:
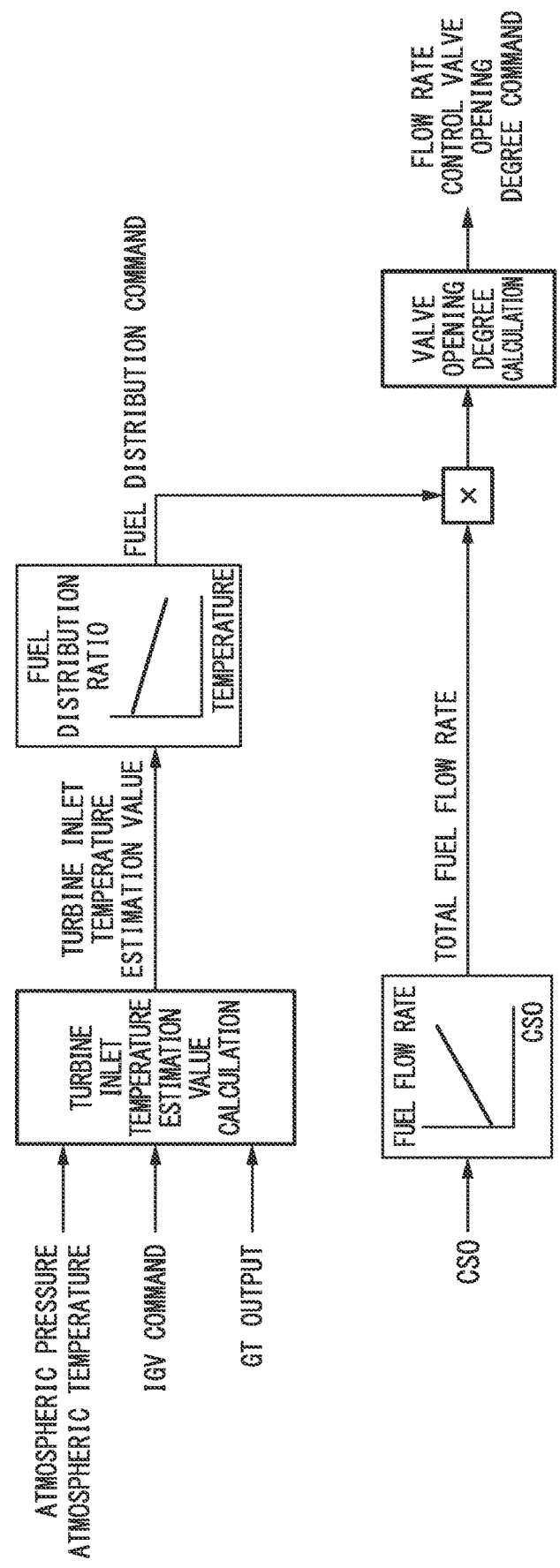
FIG. 14 is a diagram illustrating an example of a gas turbine fuel distribution control of the related art.

FIG. 13 is a diagram illustrating an example of a fuel distribution control in the fifth embodiment according to the present invention.

The fuel distribution control of this embodiment will be described with reference to FIG. 13. This embodiment is a combination of the third embodiment and the fourth embodiment.

First, the load change rate calculation unit 57 calculates a load change rate (109). The load change rate calculation unit 57 outputs the calculated load change rate to the coefficient calculation unit 58 and the load change rate determination unit 59.

The coefficient calculation unit 58 determines a weighting coefficient on the basis of the load change rate, similar to the third embodiment (110). The coefficient calculation unit 58 outputs the weighting coefficient to the load change rate determination unit 59.

The load change rate determination unit 59 determines whether the load change rate acquired from the load change rate calculation unit 57 is equal to or greater than the threshold value Q, and outputs the weighting coefficient according to the load change rate acquired from the coefficient calculation unit 58 to the gas turbine output correction amount calculation unit 56 if the load change rate is equal to or greater than the threshold value Q. Further, if the load change rate is smaller than the threshold value Q, the load change rate determination unit 59 outputs the value "0" to the gas turbine output correction amount calculation unit 56 (112).

The gas turbine output correction amount calculation unit 56 calculates a gas turbine output correction value from a CSO, similar to the second to fourth embodiments (106), and multiplies the gas turbine output correction value by the weighting coefficient acquired from the load change rate determination unit 59 (111). The gas turbine output prediction value calculation unit 51 acquires a value after the multiplication, and adds the value to an actually measured gas turbine output value to calculate a gas turbine output prediction value (108).

The turbine inlet temperature estimation unit 52 calculates a turbine inlet temperature on the basis of the gas turbine output prediction value calculated as above, an atmospheric temperature, an atmospheric pressure, and an IGV opening command value, and the fuel distribution command value calculation unit 53 determines a distribution ratio of fuel that is supplied to each fuel system on the basis of the turbine inlet temperature.

According to this embodiment, it is possible to have all of the effects of the second to fourth embodiments.

The turbine inlet temperature estimation unit 52 is an example of a combustion temperature estimation value calculation unit. Further, the atmospheric pressure or the atmospheric temperature is one example of an atmospheric condition. Further, the load change rate or the target rate is an example of a value indicating an output change of the gas turbine per unit time. Further, the IGV 14 is an example of a valve that controls an amount of air that is mixed with the fuel and burned.

The fuel control device 50 described above includes a computer system provide therein. Each process in the fuel control device 50 described above is stored in a non-transitory computer-readable recording medium in the form of a program, and the above processes are performed by a computer reading and executing this program. Here, the computer-readable recording medium refers to a magnetic disk, a magneto-optical disk, a CD-ROM, a DVD-ROM, a semiconductor memory, or the like. Further, this computer program may be distributed to the computer via a communication line, and the computer receiving this distribution may execute the program.

Further, the above program may be a program for realizing some of the above-described functions. Further, the program may be a program capable of realizing the above-described functions in combination with a program previously stored in a computer system, that is, a differential file (a differential program).

In addition, the components in the above-described embodiments can be appropriately replaced with well-known components without departing from the spirit and scope of the present invention. Further, the technical scope of the present invention is not limited to the above embodiments, and various changes can be made without departing from the spirit and scope of the present invention.

INDUSTRIAL APPLICABILITY

According to the fuel control device, the combustor, the gas turbine, the control method, and the program described above, it is possible to suppress a deviation between a target fuel system fuel ratio for a turbine inlet temperature and an actual fuel system fuel ratio even in a transient period of a load change.

REFERENCE SIGNS LIST

10 Gas turbine
11 Air compressor
12 Combustor
13 Turbine
14 IGV
15 Rotor
16 Power generator
17 Power meter
18 Pilot system fuel flow rate control valve
19 Main system fuel flow rate control valve
20 Top hat system fuel flow rate control valve
21 Fuel supply device
22 Pressure gauge
23 Thermometer
50 Fuel control device
51 Gas turbine output prediction value calculation unit
52 Turbine inlet temperature estimation unit
53 Fuel distribution command value calculation unit
54 Total fuel flow rate calculation unit
55 Valve opening degree calculation unit
56 Gas turbine output correction amount calculation unit
57 Load change rate calculation unit
58 Coefficient calculation unit
59 Load change rate determination unit

The invention claimed is:
1. A fuel control device, comprising:
a combustion temperature estimation value calculation unit that calculates a temperature estimation value when a mixture of fuel and inflow air is burned using an atmospheric condition, an opening degree command value of a valve that controls the amount of the inflow air that is mixed with the fuel and burned, and an output prediction value calculated on the basis of a fuel control signal command value used for calculation of a total fuel flow rate flowing through a plurality of fuel supply systems;

a fuel distribution command value calculation unit that calculates a fuel distribution command value indicating a distribution of fuel output from the plurality of fuel supply systems on the basis of the temperature estimation value, and outputs the fuel distribution command value; and a valve opening degree calculation unit that calculates each valve opening degree of a fuel flow rate control valve of the plurality of fuel supply systems on the basis of the fuel distribution command value and the total fuel flow rate based on the fuel control signal command value, wherein the output prediction value calculated on the basis of the fuel control signal command value is an output prediction value by which a change of output, which occurs during a period from calculation of the temperature estimation value to control of the valve opening degree according to the fuel distribution command value based on the temperature estimation value for thereby proactively compensating for a time delay of a turbine inlet temperature estimation value, and wherein the fuel distribution command value calculation unit calculates the fuel distribution command value on the basis of the temperature estimation value calculated using the output prediction value.

2. The fuel control device according to claim 1, comprising:

a gas turbine output prediction value calculation unit that calculates the output prediction value on the basis of a predetermined correspondence relationship between the fuel control signal command value and an output value of a gas turbine.

3. The fuel control device according to claim 1, comprising:

a gas turbine output correction amount calculation unit that calculates a gas turbine output correction amount for correcting the output prediction value on the basis of a predetermined correspondence relationship between the fuel control signal command value and a value for correcting an output of a gas turbine, and the fuel control signal command value; and a gas turbine output prediction value calculation unit that calculates the output prediction value using an actually measured value of an output value of the gas turbine and the gas turbine output correction amount.

4. The fuel control device according to claim 3, comprising:

a coefficient calculation unit that calculates a weighting coefficient for the gas turbine output correction amount according to a value indicating the change of output of the gas turbine per unit time, which is calculated based on the actually measured value, wherein the gas turbine output correction amount calculation unit calculates the gas turbine output correction amount according to a load change rate by multiplying the gas turbine output correction amount by the weighting coefficient calculated by the coefficient calculation unit.

5. The fuel control device according to claim 3, comprising:

a load change rate determination unit that detects the change of output of the gas turbine per unit time and sets the gas turbine output correction amount to 0 when the output change is smaller than a predetermined value.

6. A combustor comprising the fuel control device according to claim 1.

7. A gas turbine comprising the fuel control device according to claim 1.

8. A control method comprising:

calculating, by a fuel control device, a temperature estimation value according to a load change when a mixture of fuel and inflow air is burned using an atmospheric condition, an opening degree command value of a valve that controls the amount of the inflow air that is mixed with the fuel and burned, and an output prediction value calculated on the basis of a fuel control signal command value used for calculation of a total fuel flow rate flowing through a plurality of fuel supply systems, calculating, by the fuel control device, a fuel distribution command value indicating a distribution of fuel output from the plurality of fuel supply systems on the basis of the temperature estimation value, and outputting the fuel distribution command value, and calculating, by the fuel control device, each valve opening degree of a fuel flow rate control valve of the plurality of fuel supply systems on the basis of the fuel distribution command value and the total fuel flow rate based on the fuel control signal command value, wherein the output prediction value calculated on the basis of the fuel control signal command value is an output prediction value by which a change of output, which occurs during a period from calculation of the temperature estimation value to control of the valve opening degree according to the fuel distribution command value based on the temperature estimation value for thereby proactively compensating for a time delay of a turbine inlet temperature estimation value, and wherein, in the calculating and outputting of the fuel distribution command value, the fuel distribution command value is calculated on the basis of the temperature estimation value calculated using the output prediction value.

9. A non-transitory computer-readable medium, which records a program for causing a computer of a fuel control device to execute:

a step that calculates a temperature estimation value when a mixture of fuel and inflow air is burned using an atmospheric condition, an opening degree command value of a valve that controls the amount of the inflow air that is mixed with the fuel and burned, and an output prediction value calculated on the basis of a fuel control signal command value used for calculation of a total fuel flow rate flowing through a plurality of fuel supply systems;

a step that calculates a fuel distribution command value indicating a distribution of fuel output from the plurality of fuel supply systems on the basis of the temperature estimation value, and outputs the fuel distribution command value; and a step that calculates each valve opening degree of a fuel flow rate control valve of the plurality of fuel supply systems on the basis of the fuel distribution command value and the total fuel flow rate based on the fuel control signal command value, wherein the output prediction value calculated on the basis of the fuel control signal command value is an output prediction value by which a change of output, which occurs during a period from calculation of the temperature estimation value to control of the valve opening degree according to the fuel distribution command value based on the temperature estimation value for thereby proactively compensating for a time delay of a turbine inlet temperature estimation value, and wherein, in the step of calculating, the fuel distribution command value is calculated on the basis of the temperature estimation value calculated using the output prediction value.

\* \* \* \* \*